April 26, 1949.  K. C. OVERHOLT  2,468,307
TEMPLATE HOLDING DEVICE FOR ROTARY
BORING MILLS OR THE LIKE
Filed Dec. 8, 1947  2 Sheets-Sheet 1

INVENTOR.
KENNETH C. OVERHOLT
BY
William Cleland
Attorney

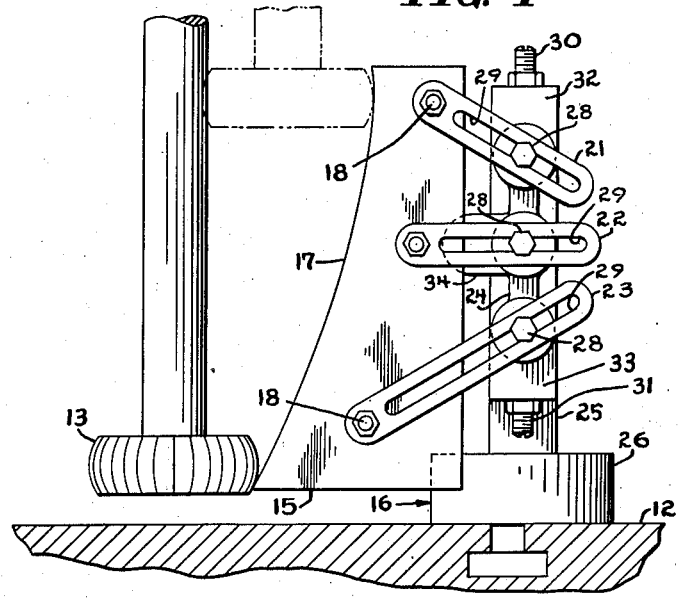
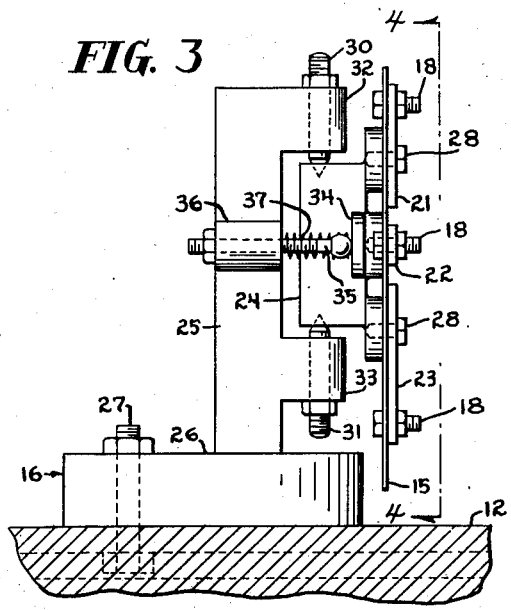

Patented Apr. 26, 1949

2,468,307

UNITED STATES PATENT OFFICE 2,468,307

TEMPLATE HOLDING DEVICE FOR ROTARY BORING MILLS OR THE LIKE

Kenneth C. Overholt, Akron, Ohio

Application December 8, 1947, Serial No. 790,364

10 Claims. (Cl. 90—19)

This invention relates to machine tools, and in particular relates to a template holding device for milling machines, boring mills, or the like.

Heretofore, in machining work on a rotary table of a milling machine or boring mill, to provide a transversely irregular, laterally arcuate surface, it has been the usual practice to make a series of arcuate cuts by relatively rotating the rotatable table on which the work is clamped to move the work past the rotary cutter, and by trial and error methods to determine when the contour is correct by use of checking templates placed against the machined surfaces. This method of checking has not been satisfactory because a true check of the contour could only be made when the contour was in perfect conformity with the template.

One object of the invention is to provide a contour template holding device for attachment to the rotary table of a milling machine, boring mill, or the like by which a rotary cutter may be pre-set to make arcuate cuts in the work, progressively to provide a desired transversely irregular contour in the work, without necessarily requiring subsequent checking thereof for accuracy.

Another object of the invention is to provide a template holding device of the character decribed wherein is provided improved means for preventing damage to the template by the rotary cutter.

Another object of the invention is to provide a template holding device of the character described having improved means for quickly removably and interchangeably mounting the template to be in desired position of use.

These and other objects of the invention will be manifest from the following brief description of the accompanying drawings.

Of the accompanying drawings:

Figure 3 is a cross-section taken substantially on the line 3—3 of Figure 1.

Figure 4 is a cross-section taken substantially on the line 4—4 of Figure 3.

Figure 1:
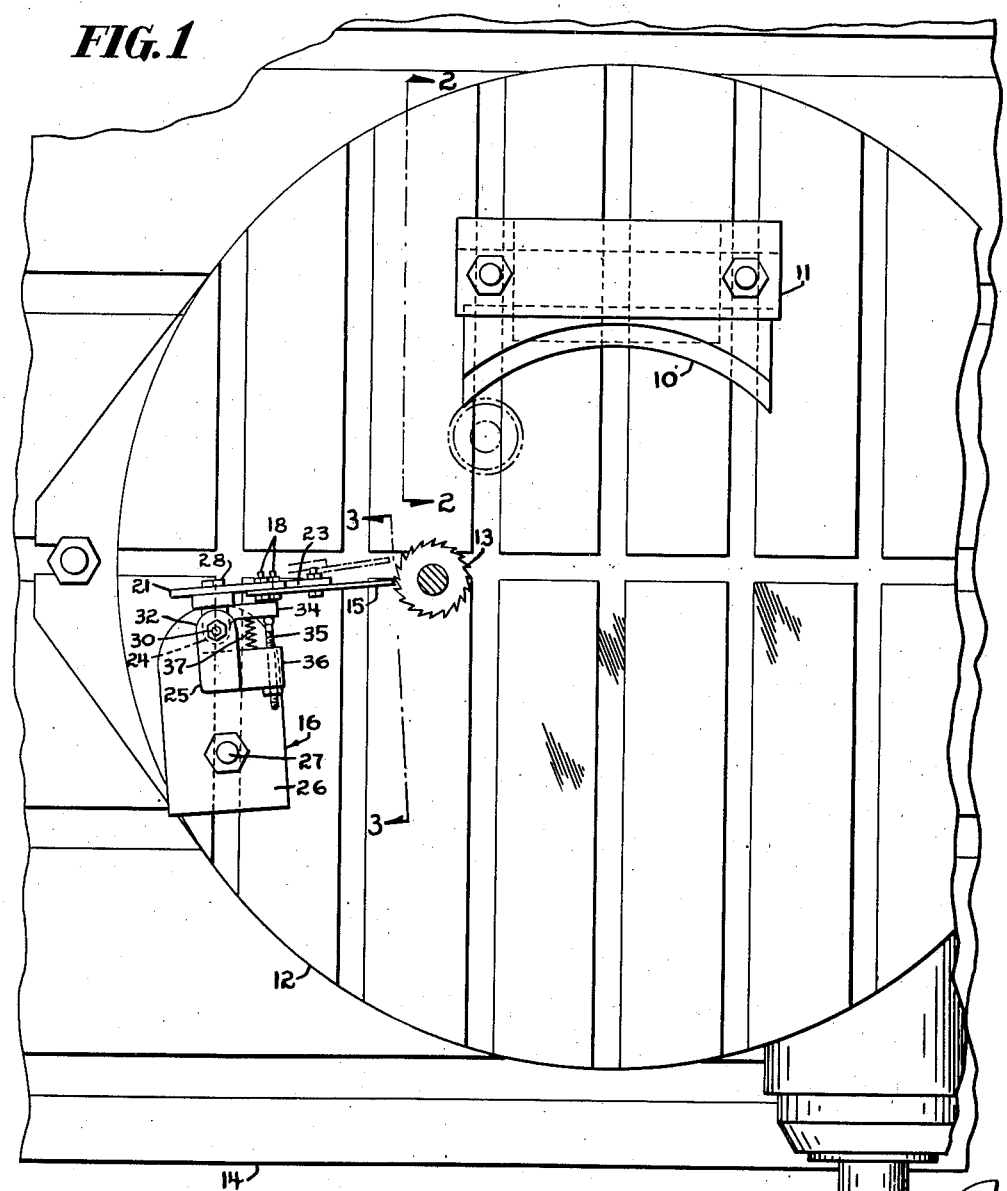
Figure 1 is a fragmentary top plan view of a rotary boring mill having a template holding device incorporated therein, in accordance with the invention.
Figure 2:
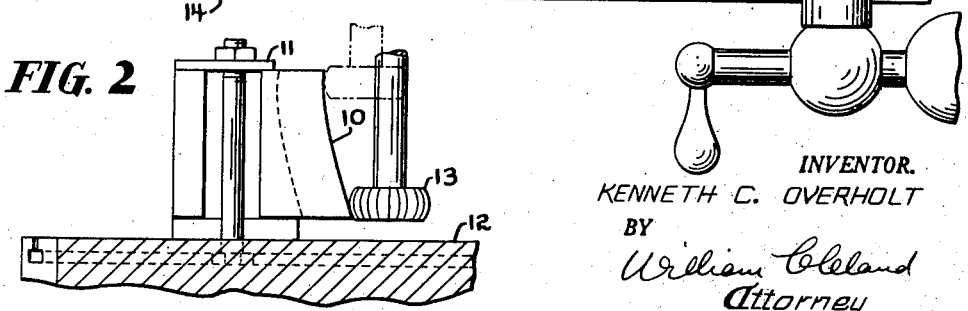
Figure 2 is a cross-section taken substantially on the line 2—2 of Figure 1.

Referring to the drawings, the numeral 10 designates a block of metal work, suitably clamped at 11 to a rotatable table 12, the table being rotatable in known manner to move the work 10 back-and-forth past a relatively fixed rotary cutter 13, and the table also being vertically and horizontally movable with the bedplate 14 thereof in known manner to present the work at variously adjusted heights and radii with respect to the cutter.

A flat template 15 is mounted on a holder 16 to extend vertically in a plane presenting a predeterminately contoured edge 17 inwardly to be movable in an arcuate path past the cutter, with rotation of the table. For so mounting the template, bolts 18, 18 are received through apertures therein and through apertures in the ends of three elongated links 21, 22 and 23, releasably secured to a member 24 pivoted to an upright 25. Member 24 is supported on an integral base 26 which is apertured to receive a bolt 27 for releasably clamping holder 16 in various positions on the table 12, as shown. For thus releasably clamping the links 21, 22 and 23 to member 24, clamping screws 28 are received through slots 29 in the respective links and threaded in the member. That is, by angular and sliding adjustment of the links the template 15 is adjustable to desired position of the contoured edge 17 thereof with respect to the work 10. Templates within a wide range of shapes and sizes are easily mounted in place in this manner. The pivotal connection of member 24 to the upright 25 is accomplished through pins 30 and 31 adjustably threaded through vertically spaced lugs 32 and 33 in said upright to present inwardly opposite pointed ends of the pins in conical recesses in vertically opposite faces of member 24, whereby the member 24 with the template attached is free to pivot on a vertical axis, as limited by engagement of a lug 34 on the member 24 with the end of a stop pin 35 adjustably extended from an oppositely disposed lug 36 on the upright. A tension spring 37 between the lugs 34 and 36 retains the member 24 is said stopped position.

In use or operation of the template holder 16 for setting the cutter to make a contour cut in the work 10, the table 12 is relatively adjusted to desired position and height to allow the cutter first lightly to contact the topmost portion of the template contour 17, for example, then the table is rotated to swing the work in an arc past the cutter 13, thereby to cut the work to a depth corresponding to the contacted portion of template 17. This setting and cutting operation is repeated in successive sweeps as the table 12 is progressively lowered, until the complete contour is cut in the work. The work will then have the exact contour of the template and no other check as to contour will be necessary. If for some reason the table 12 is operated to move the template in counter-clockwise direction with the table (see Figure 1), in such a manner that the contoured edge portion 17 of the template would strike the cutter, the template will simply pivot away from the cutter on hinge pins 30 and 31, as indicated in chain-dotted lines, and damage to the template will thereby be obviated.

Modifications of the invention may be resorted to without departing from the spirit thereof or the scope of the appended claims.

What is claimed is:

1. In machining apparatus the combination with a work-supporting table which is relatively movable horizontally with respect to a cutting tool and vertically adjustable relatively thereof, of a tool-setting device mounted on said table, said device comprising an upright, a template attaching member on said upright, a contour template having a contoured edge portion corresponding to the desired contour of the work, and means for releasably attaching said template to said member with said contoured edge portion in the path of said tool relatively adjusted thereto.

2. The combination as set forth in claim 1, said member being pivoted on said upright and a stop being provided to limit swinging movement of the member in one direction away from said path of the tool.

3. The combination as set forth in claim 2, resilient means being provided for yieldingly urging said member against said stop.

4. The combination as set forth in claim 3, including releasable attaching means for adjustably securing the template on said member.

5. The combination as set forth in claim 4, said attaching means including a plurality of elongated elements, screw means for clamping said elements to said member in various angularly adjusted positions, and screw means for clamping said template to said elongated elements.

6. In machining apparatus, the combination with a work-supporting table which is relatively rotatable in a horizontal plane with respect to a cutting tool and vertically adjustable relatively thereof, of a tool-setting device mounted on said table, said device comprising a support, a template attaching member pivoted on said support to swing on an axis angularly of said plane of the table, a contour template having a contoured edge portion corresponding to the desired contour of the work, and means for releasably attaching said template to said member with said contoured edge portion presented inwardly toward the axis of rotation of the table, said template thereby being vertically and horizontally adjustable with the table with respect to said tool for making successive settings thereof against said contoured edge for successive cuts in the work corresponding to the contoured edge portions.

7. The combination as set forth in claim 6, a stop being provided to limit pivotal movement of the member in one direction.

8. The combination as set forth in claim 7, resilient means being provided for yieldingly urging said member against said stop.

9. The combination as set forth in claim 8, including releasable attaching means for adjustably securing the template on said member in a plane angularly of said table.

10. The combination as set forth in claim 9, said attaching means including a plurality of separate links, threaded elements for clamping said links to said member in various angularly adjusted positions, and threaded elements for clamping said template to said links.

KENNETH C. OVERHOLT.

REFERENCES CITED

The following references are of record in the file of this patent:

UNITED STATES PATENTS

| Number | Name | Date |
| --- | --- | --- |
| 506,089 | Beeler | Oct. 3, 1893 |
| 624,535 | Powel | May 9, 1899 |
| 1,073,547 | Tunes | Sept. 16, 1913 |
| 1,903,528 | Curle | Apr. 11, 1933 |
| 2,187,794 | Schmidt | Jan. 23, 1940 |
| 2,206,586 | Taylor | July 2, 1940 |